United States Patent [19]

Frankhouse et al.

[11] Patent Number: 5,294,758
[45] Date of Patent: Mar. 15, 1994

[54] ELECTRICAL SWITCH ASSEMBLY

[75] Inventors: Jay M. Frankhouse, Holland; Scott S. Bainbridge, Byron Center, both of Mich.

[73] Assignee: Prince Corporation, Holland, Mich.

[21] Appl. No.: 865,044

[22] Filed: Apr. 6, 1992

[51] Int. Cl.⁵ ............................ H01H 9/00; H01H 21/80
[52] U.S. Cl. ................................... 200/5 R; 200/517
[58] Field of Search .................. 200/5 R, 5 A, 52 R, 200/512-517, 339, 335, 6 A

[56] References Cited

U.S. PATENT DOCUMENTS

| 4,015,092 | 3/1977 | Suzuki | 200/5 R |
| 4,065,650 | 12/1977 | Lou | 200/5 R |
| 4,180,713 | 12/1979 | Gonzales | 200/52 R |
| 4,473,724 | 9/1984 | Suzuki | 200/5 R |
| 4,517,424 | 5/1985 | Kroczynski | 200/52 R |
| 4,584,443 | 4/1986 | Yaeger | 200/6 A |
| 4,678,872 | 7/1987 | Gutman | 200/5 R |
| 4,701,629 | 10/1987 | Citroen | 200/52 RX |

Primary Examiner—J. R. Scott
Attorney, Agent, or Firm—Price, Heneveld, Cooper, DeWitt & Litton

[57] ABSTRACT

A switch assembly includes a housing with facing mounting surfaces on which opposed facing switches are mounted. In one embodiment, three spaced generally planar mounting members extended between end supports with actuating levers extending in the two spaces between each of the horizontally extending mounting members. Mounted in facing relationship on opposing surfaces are switches such that an actuating lever extending into a space between the opposing surfaces engage a first switch when moved in a first direction and a second switch when moved in a second direction. The actuating levers are, in the preferred embodiment, pivotally coupled by axles means to end walls supporting the switch mounting members so that they can be moved in first and second directions for actuating the associated first or second switch with each of the levers. The intermediate partition member or wall can include one or more switches on both upper and lower surfaces while the lower member or floor can contain a single one or a row of switches as can the inside of the top surface. As a result there can exist four switches in vertical alignment, while the elongated planar support members can similarly carry a plurality of horizontally spaced switches. Such an arrangement, therefore, provides for vertical and horizontally stacking of switches with the levers being mounted on offset pivot axles and coupled to relatively elongated actuating bars for ease of operation.

41 Claims, 4 Drawing Sheets

ELECTRICAL SWITCH ASSEMBLY

BACKGROUND OF THE INVENTION

The present invention relates to an electrical switch assembly and one particularly useful for providing multiple switch controls for use in vehicles such as automobiles.

Most modern vehicles include a variety of electrically operated accessories such as electrically operated windows, adjustable seats, sunroofs and the like. Each of these devices will typically include a control switch moveable in a first and a second direction for example, for raising or lowering a window. Thus, each device to be controlled frequently will require either two separate switches or multiple switch contacts, for example, with a rocker-type switch which employs a single pole double throw configuration. Frequently, a bank of such switches, for example, for electrical windows are placed either in a center console between the front seats of a vehicle or in a door armrest adjacent the driver. An array of such switches are normally aligned on a horizontal surface and therefore require considerable space.

When a vehicle includes power operated windows, multiple adjustment seats, and other accessories, it can be appreciated that a considerable amount of space is required for the installation of switches for each device to be controlled and for each direction of control. With the downsizing of modern vehicles, space is becoming a premium and therefore, the location of switches can become a difficult engineering problem or if switches are placed in available space, they may not be located in a conveniently accessible ergonometric location. Accordingly, there exists a need for a compact, high-density switch assembly which will provide multiple easily operated switches in a minimum amount of space such that a variety of electrical accessories can be controlled from a convenient location for the vehicle occupant.

SUMMARY OF THE PRESENT INVENTION

The electrical switch assembly of the present invention satisfies this need by providing a three dimensional array of switches with vertically and horizontally arranged switches which are controlled by similarly vertically and horizontally arranged actuating levers. Such construction permits the horizontal and vertical spacing of a relatively large number of switches.

In a preferred embodiment of the invention, the switch assembly included a housing with facing switch mounting surfaces on which opposed facing switches were mounted. In one embodiment, three spaced generally planar mounting members extended between end supports with actuating levers extending in the two spaces between each of the horizontally extending mounting members. Mounted in facing relationship on opposing surfaces are switches such that an actuating lever extending into a space between opposing surfaces engage a first switch when moved in a first direction and a second switch when moved in a second direction. The actuating levers are, in the preferred embodiment, pivotally coupled by axle means to end walls supporting the switch mounting members so that they can be moved in first and second directions for actuating the first or second switch associated with each of the levers. As can be seen, the intermediate partition member or wall can include one or more switches on both upper and lower surfaces while the lower member or floor surface can contain a single one or a row of switches as can the inside of the top surface. As a result, there can exist four switches in vertical alignment, while the elongated planar support members can similarly carry a plurality of horizontally spaced switches.

Such an arrangement, therefore, provides for high density mounting of control switches in a vehicle in which the switches are vertically and horizontally stacked with the actuating levers being mounted on offset pivot axles and coupled to relatively elongated actuating bars for ease of operation. These and other features, objects and advantages of the present invention will become apparent upon reading the following description thereof together with reference to the accompanying drawings in which:

DETAILED DESCRIPTION OF THE PREFERRED EMBODIMENT

Figure 1:
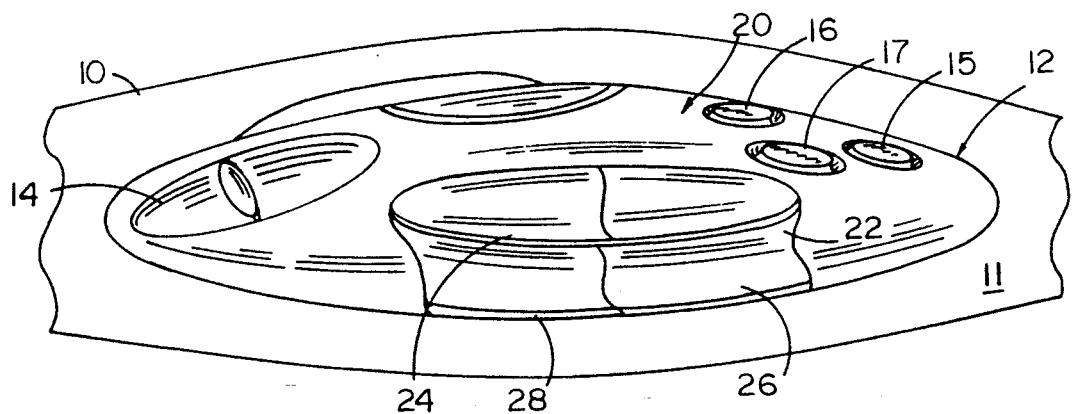
FIG. 1 is a fragmentary rear perspective view of a center console in a vehicle embodying a switch assembly of the present invention.
Figure 2:
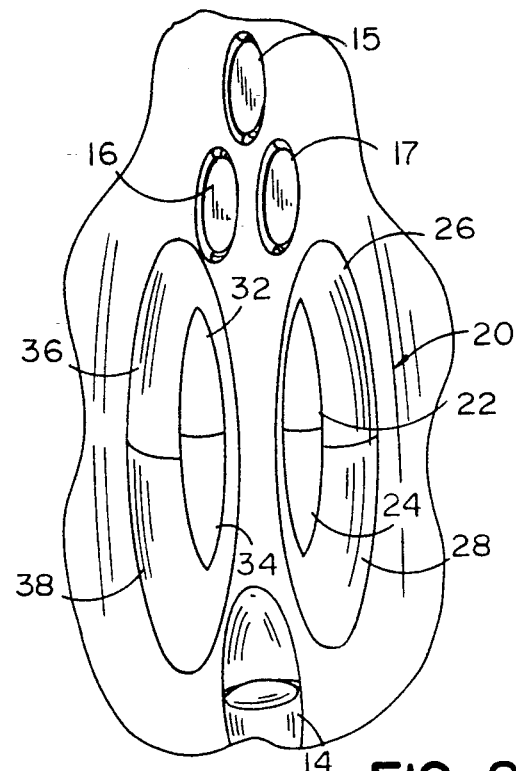
FIG. 2 is a fragmentary top plan view of the structure shown in FIG. 1.
Figure 3:
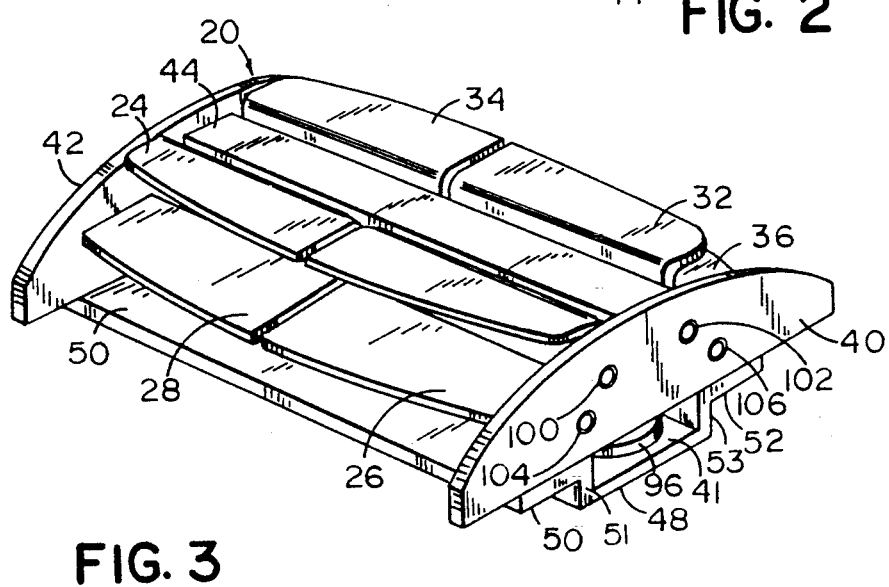
FIG. 3 is a perspective view of a switch assembly of the type shown in FIG. 1 shown removed from the vehicle.
Figure 4:
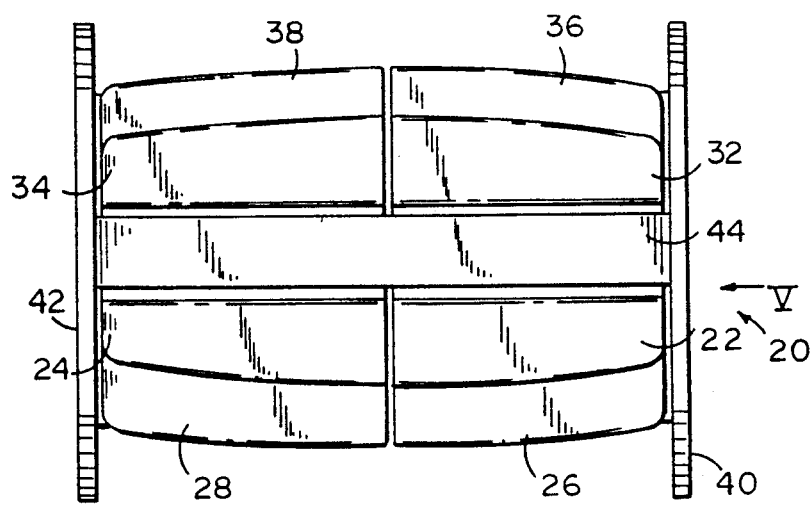
FIG. 4 is a top plan view of the structure shown in FIG. 3.

Referring initially to FIGS. 1 and 2, there is shown a center console 10 mounted in a vehicle such as an automobile and which includes a control module 12 mounted in the upper surface 11 thereof typically located between the front seats or in the center area of the vehicle slightly forwardly of the front edge of the seats. Thus, the module 12 is readily accessible by either the vehicle driver or front seat passenger. Similar modules 12 may be located on a door armrest or in rear seat area if multiple control functions are desired in these other locations as well. Module 12 may include a courtesy light 14 for directing illumination rearwardly to the rear seating of a vehicle when separate front seats are employed. A number of push-button switches 15, 16 and 17 are also mounted near the forward edge of module 12 for controlling a variety of functions such as courtesy lamps, seat exit position controls or memory position for first and second drivers respectively. In addition, module 12 incorporates in its convexly curved housing, a switch assembly 20 embodying the present invention which is located behind switches 15-17 and slightly forwardly of courtesy light 14.

Switch assembly 20 includes four right side actuating members and left right side actuating members. The right side actuating members include two upper actuators including upper 22 located forwardly in housing 12, and upper actuator 24 located rearwardly. The right side actuators also include a forward lower actuator member 26 and a rearward lower actuator member 28. The left side group of four actuator members include a forward upper actuator member 32, a rearward upper actuator member 34, a forward lower actuator member 36 and a rearward lower actuator member 38. Thus, switch assembly 20 includes eight actuator members, each of which are, as described below, mounted to the switch assembly housing for movement upwardly or downwardly to control separate switches such that a total of at least 16 switch contacts can be made by the switch assembly 20. Thus, module 12 with switch assembly 20 in addition to the discrete switches 15, 16 and 17, can control 16 other vehicle accessory functions.

In one embodiment, for example, the upper four switches 22, 24, 32 and 34 can control the right front window for up and down movement, the right rear window for up and down movement, the left front window for up and down movement and the left rear window for up and down movement, respectively. The lower switch actuators 26, 28, 36 and 38 can be used for controlling the position of the passenger side seat with switch actuator 26 being used, for example, for moving the seat forwardly and rearwardly. Actuator 28 can be used for moving the seat upwardly and downwardly. The corresponding levers 36 and 38 on the left bank of actuators 10 can similarly control the driver's side seat. Thus, the switch assembly 20 provides, in a relatively compact space, a great number of control functions and each has an actuator control ergonometrically designed and having a size sufficient for easy access and convenience of operation. The actuating members, as described below in detail, are seen in the top plan view of FIG. 2 and are horizontally and vertically offset such that each of the separate actuators can be conveniently operated. This array of staggered offset switch actuators and the corresponding switches as described below provide a high density of switch control functions for electrically actuated vehicle accessories and yet provide convenient sized actuating members for convenient operation.

Figure 5:
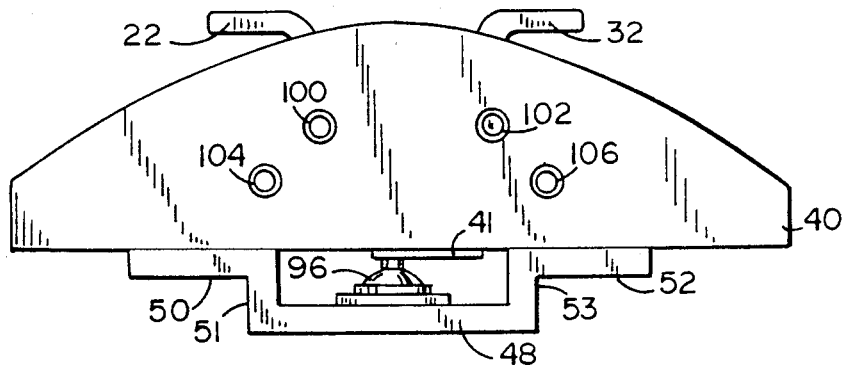
FIG. 5 is a greatly enlarged end elevational view of the switch assembly shown in FIGS. 3 and 4.
Figure 6:
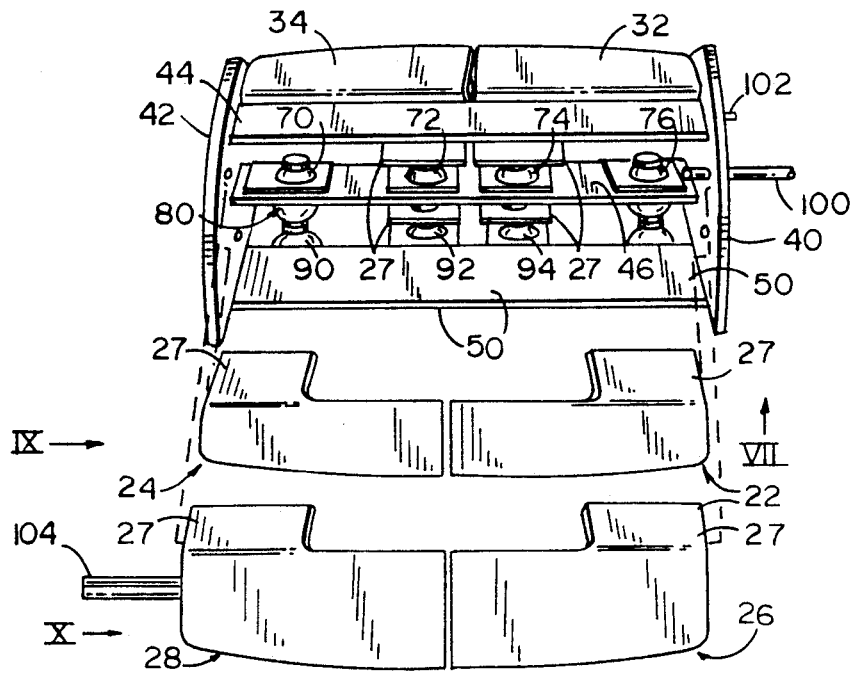
FIG. 6 is a partially exploded front perspective view of the switch assembly shown in FIGS. 3-5.
Figure 7:
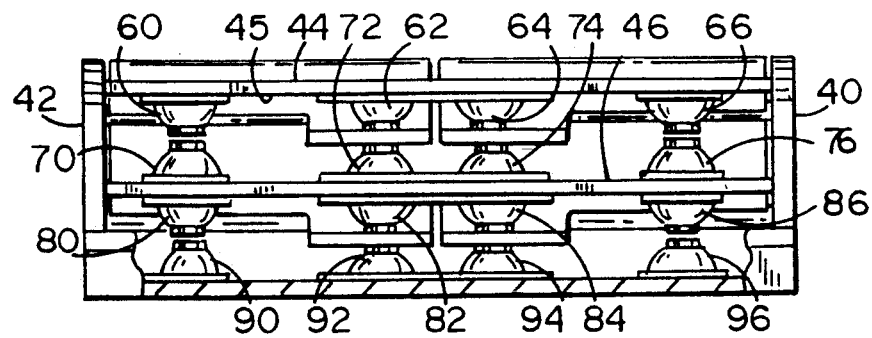
FIG. 7 is a front elevational view of the switch assembly shown in FIG. 6 taken in the direction of Arrow VII in FIG. 6.
Figure 8:
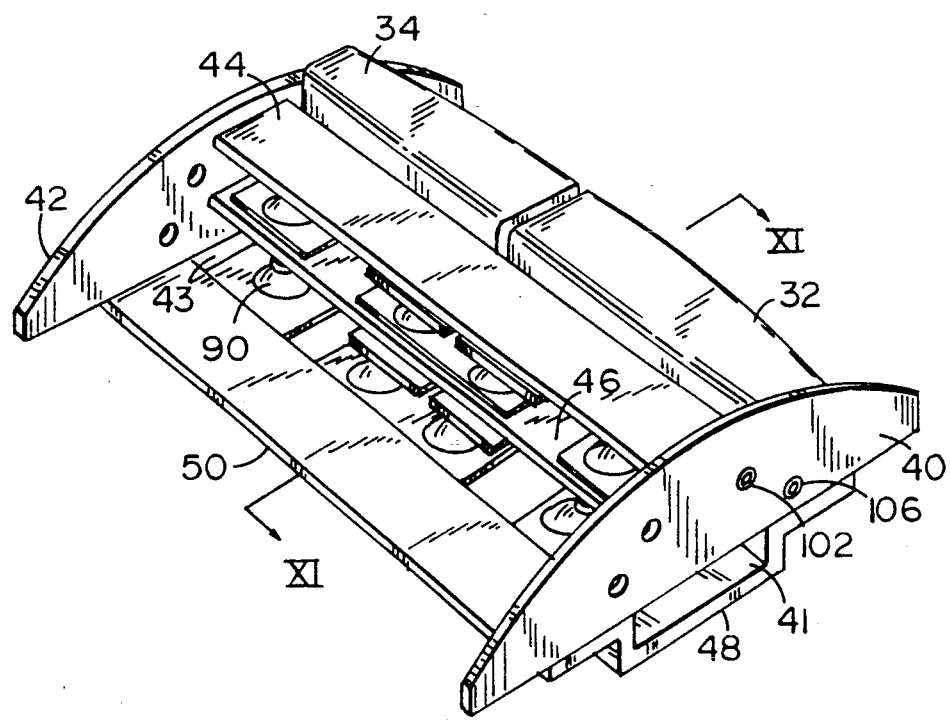
FIG. 8 is a upper right perspective view of the structure shown in FIG. 7.
Figure 11:
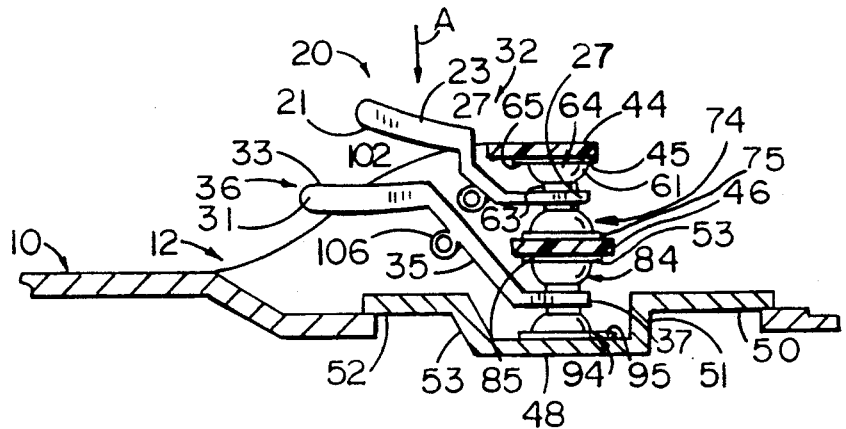
FIG. 11 is a fragmentary cross-sectional view of the structure shown in FIG. 8 taken along section line XI—XI in FIG. 8.

The switch assembly 20 includes a switch housing defined by a pair of end walls 40 and 42 (FIGS. 3-8) between which there extends a top wall 44 comprising a generally rectangular planar panel, an intermediate generally horizontally extending partitioning wall 46 which is spaced below top wall 44 and, as best seen in FIGS. 6, 7 and 11, a floor 48 which is stepped downwardly as best seen in FIGS. 5 and 11, by forward and rearward platform floors 50 and 52 and spacer blocks 51 and 53 all of which extend between end walls 40 and 42. The housing so defined is preferably made of a polymeric material such as polycarbonate, ABS, or other suitable material for electrical use and for use in the automotive environment.

There are 16 switches mounted within the switch housing as best seen in FIG. 7, although the arrangement of the switches is also shown in FIGS. 5, 6, 8 and 11. The switches are PC board mount switches which are momentary push-button switches typically comprising a moveable contact which engages conductive elements on a printed circuit board to which the switch is mounted. The conductors may include a single pair of conductors such that one of the 16 switches will be a single pole single throw switch, although, as it can be appreciated by those skilled in the art, each switch may cross over multiple conductors and therefore be a multiple pole single throw momentary switch. These switches are commercially available and in common use and typically known as elastomeric dome switches in which the actuator is a resilient dome in which a conductive pad is mounted.

In the embodiment shown, and referring initially to FIG. 7, the top wall 44 includes a lower surface 45 to which a printed circuit board 65 including four switches 60, 62, 64 and 66 are mounted. Each of these switches include a switch body such as body 61 shown in FIG. 11 and a resilient dome 63 extending outwardly therefrom. The switch body and actuator dome element are mounted to the circuit board 65 (FIG. 11) as an integral assembly. Thus, printed circuit board 65 will include the four spaced switches 60, 62, 64 and 66, which face downwardly, as best seen in FIG. 7. Each of these switches will be engaged by only the downwardly actuation of the upper actuator members 22, 24, 32 and 34, as described in detail below.

Positioned in vertical alignment directly below each of the switches 60, 62, 64 and 66, as best seen in FIGS. 7 and 11, and mounted to the vertically spaced horizontally extending partitioning wall 46, is a second circuit board 75 including four upwardly extending switches 70, 72, 74 and 76, which have actuators 73 aligned directly under and in spaced relationship to the corresponding actuators 63 of the aligned correspondingly least significantly digit numbered switches on the undersurface of top wall 44. Thus, the top surface of partition wall 46 includes four switches aligned with the switches mounted to the undersurface of the top wall. As best seen in FIG. 11 and also as seen in FIG. 7, the actuators 63 and 73 of the facing switches 64 and 74 and correspondingly facing switches are spaced a distance apart sufficient for an actuating lever 27 of actuator 32 (FIG. 11) to extend between the actuators for the selective actuation of either of the two switches by a particular actuator as described in greater detail below in connection with the mounting arrangement for the actuating member.

Mounted to the undersurface of partition wall 46 is another circuit board 85 (FIG. 11) which includes four switches 80, 82, 84 and 86 with actuators directed downwardly in a direction opposite switches 70, 72, 74 and 76. Finally mounted to the floor 48 and projecting upwardly is a circuit board 95 (FIG. 11) having a line of switches 90, 92, 94 and 96 mounted thereto with actuator domes pointed upwardly and in spaced relationship to the actuators of the correspondingly numbered switches 80, 82, 84 and 86 such that the actuator such as actuator 36 shown in FIG. 11, can extend between the facing actuating domes of facing switches 84 and 94, for example, for the selective actuation of either one of the switches by the upward or downward actuation of the actuating member as described below. Thus, it is seen that 16 such switches with four switches being vertically aligned and stacked on the three horizontally extending mounting walls 44, 46 and 48 are mounted centrally within the housing of the switch assembly 20. A line of four switches also extend horizontally in spaced relationship between the end walls 40 and 42. The circuit board conductor elements which engage the switch contact within the actuator dome extend to one or both inside surfaces of end walls 40 and 42 and outwardly through the bottom slots 41 and 43 (FIGS. 3, 5 and 8) by a ribbon cable (not shown) for connection to the vehicle's electrical system. Having described the mounting of the switches to the switch assembly and particularly to the housing, a description of the mounting of the generally S-shaped actuating members is now presented primarily in connection with FIGS. 5-8 and 11.

As seen in FIG. 5 and as partly shown in FIG. 6, extending between the end walls 40 and 42 of the switch housing are a pair of upper pivot rods 100 and 102 which pivotally mount the upper actuating members 22, 24, 32 and 34 between the end walls 40 and 42 of the housing. Also included are a pair of lower pivot rods 104 and 106 which extend between end walls 40 and 42 for pivotally mounting the lower actuating member 26, 28, 36 and 38 to the switch housing. In the embodiment shown, each of the pivot rods 100, 102, 104 and 106 comprise cylindrical tubes which are supported at opposite ends by the end walls 40 and 42 and which are anchored therein by suitable means such as bonding adhesives or the like. Pivotally mounted to each of the four separate pivot rods are two horizontally spaced and adjacently aligned switch actuator members. Thus, mounted to pivot rod 100 are upper actuating members 22 and 24 while mounted to rod 104 are upper actuating members 32 and 34.

Figure 9:
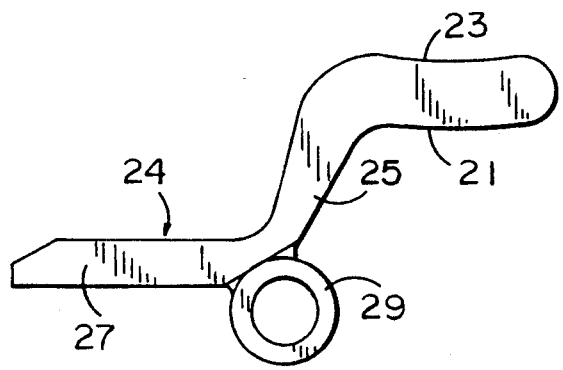
FIG. 9 is a greatly enlarged end elevational view of one of the upper actuating members taken in the direction of Arrow IX shown in FIG. 6.
Figure 10:
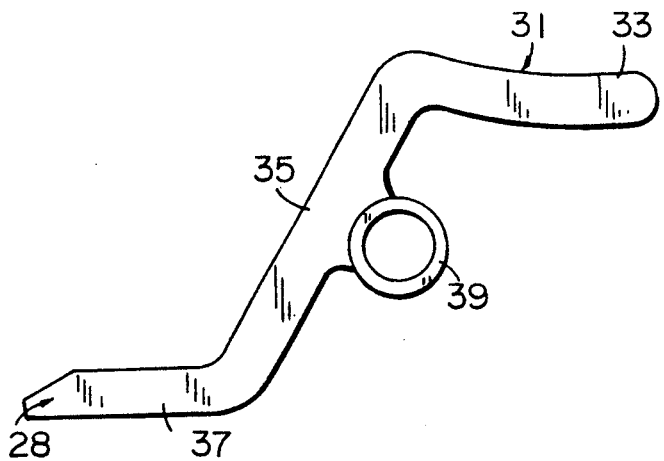
FIG. 10 is a greatly enlarged end elevational view of one of the lower actuating members shown in FIG. 6 taken in a direction indicated by Arrow X in FIG. 6.

As can be seen by reference to FIGS. 6, 9 and 10, each of the actuator members are generally S-shaped. Reference is directed initially to FIG. 9 which shows actuator member 24 in detail. Each of the upper and lower actuator members, including member 24, includes a generally rectangular elongated finger-actuated controlling arm with arm 21 associated with actuating member 24 having a convexly curved upper surface 23 which tactically informs the vehicle occupant that the switch is one of the upper switches. The lower actuators 26, 28, 36 and 38 have concavely curved upper surfaces for their controlling arms. Each of the actuator controlling arms includes an intermediate leg 25 coupling the controlling arm to the switch actuating lever 27 of actuator 24. Each of the actuators include an actuating lever 27 which is in the form of a tab which extends only partially the width of the controlling arm as best seen in FIG. 6. Also, as best seen in FIG. 6, each of the actuating levers are staggered with respect to one another and aligned to extend between a pair of corresponding facing switches of each of the pair of, switches with which the actuator is associated. Thus, actuating lever 27 of actuating member 32 is vertically aligned with and extends between switches 64 and 74 as seen in FIG. 11. Also actuating lever 27 of actuator member 24 is positioned to align between switches 60 and 70 located on the left side of the switch assembly as viewed in FIG. 7. For purposes of clarity, FIG. 7 shows the switch housing with actuators 22, 24, 26 and 28 removed as seen in FIG. 6 so that the opposite side actuators and their actuating levers with respect to the associated switches are clearly seen.

As can be seen in FIG. 6, upper actuators 22 and 24 have actuating tabs 27 which extend generally on the outer edge of the housing and are aligned with switches 60, 70, 66 and 76 respectively. Similarly, actuators 32 and 34 which are mounted on the opposite side of the center line of the switch housing include actuating levers 27 which are spaced inwardly and adjacent one another to clear tabs 27 of actuators 22 and 24 and which are aligned with switches 62 and 72 and 64 and 74 respectively as also seen in FIG. 7. Thus, for the upper actuators 22, 24, 32 and 34, the pivot axles 100 and 102 position the actuator members with their actuating lever in a horizontally extending plane and in spaced relationship aligned between the corresponding switches which they actuate as also seen in FIG. 11.

For purposes of mounting each of the actuators to the associated pivot rod, as seen in FIG. 9, with respect to actuator 24, a cylindrical longitudinally extending socket 29 is secured to the actuating lever and in the case of the upper actuator at the junction of intermediate arm 25 and actuating lever 27. The inner diameter of the cylindrical socket 29 is slightly greater than the outer diameter of the associated pivot rod 100 such that during assembly, as rod 100 is extended through end wall 40 as seen in FIG. 6, it can extend through the corresponding mounting sockets 29 of actuating levers 22 and 24. The remaining upper actuating arms are similarly constructed to provide the pivot mounting of the upper actuating arms in a position to place their actuating levers or tabs 27 between facing switches mounted to the lower surface of the top wall and upper surface of the intermediate wall. As seen in FIG. 11 for actuation of the upper switches 60, 62, 64 and 66, when the upper actuating members are depressed downwardly in a direction indicated by Arrow A in FIG. 11 causing actuating tabs 27 to move upwardly they actuate the downwardly facing top switches 60, 62, 64 or 66 depending upon which of the upper actuating members are downwardly depressed. Similarly, by raising the elongated generally rectangular controlling arms of the upper actuating members, they pivot around axle 100 and 102 in a direction opposite Arrow A and selectively actuate the lower switches 70, 72, 74 and 76 which are mounted to the top surface of intermediate wall 46.

FIG. 10 shows one of the somewhat similar lower actuating members 28 which are substantially identical to concave upper surface 33 of the controlling arm 31 to tactically inform the operator that a lower actuating member is being actuated. Each of the lower actuating members similarly include an intermediate arm 35 coupling the controlling arm to an actuating lever or tab 37. Tabs 37 of lower actuator 26 and 28 are located on the outer edge of the switch housing, as best seen in FIG. 6, while the corresponding actuating arms of the opposed facing actuators 36 and 38 are positioned centrally, as seen in FIG. 6, such that the actuating levers or tabs of the four lower actuators 26, 28, 36 and 38 are horizontally spaced in alignment between facing switch pairs 80, 90, 82, 92, 84, 94 and 86 and 96 respectively. As with the upper actuators, the lower actuator members includes a cylindrical socket 39 which has a diameter which extends over the respective pivot rods 104 and 106 as the switch assembly is constructed and which permits the relatively easy pivoting of the actuating members on the associated pivot rods. It is noted that the opposed facing switches which each of the actuating levers either 27 or 37 of the actuating arms have spring loaded actuating domes and therefore the actuating levers are biased toward a neutral position in which neither of the associated switches are actuated. This is seen in FIG. 11 in which the actuating levers are in an at rest position extending between the actuating arms of the associated switches without actuating the switches. Upon depression or raising of an actuating controlling arm, the switch will be momentarily actuated and upon its release move the controlling arm back to the neutral positions shown.

Thus, with the switch assembly shown in FIGS. 1-11, a stacked array of switches are actuated by actuating members having alternately staggered, stacked controlling arms allowing each of several compactly located relatively large controlling arms to actuate at least a pair of switches, each switch of which may include multiple contacts. In this embodiment, a large number of switches thereby can occupy a relatively small space. In a preferred embodiment, the array of 16 switches controlled by 8 actuating levers which can be raised or lowered to control an associated pair of switches was provided in a location requiring only approximately a width of 3 inches and a length of 4 inches with a depth to the package of approximately an inch and a half. In an alternative embodiment of the invention, the same type of switch assembly is arranged in a taller and narrower switch housing and is shown and now briefly described in conjunction with FIG. 12.

Figure 12:
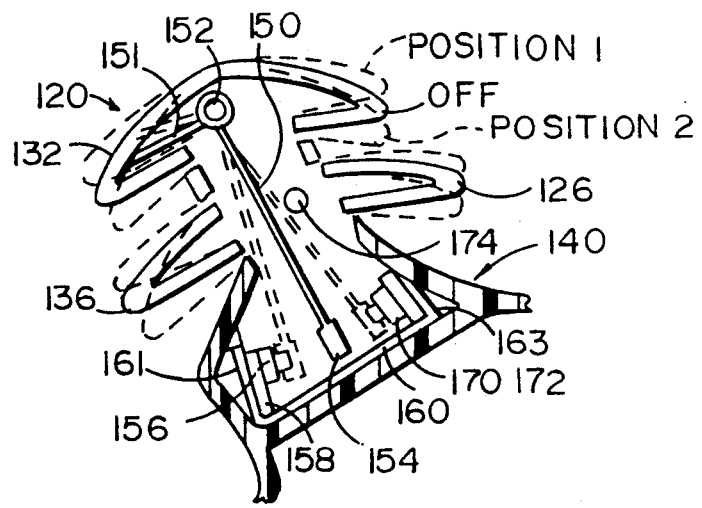
FIG. 12 is a vertical cross-sectional view of an alternative embodiment of the present invention.

In FIG. 12, there is shown a switch assembly 120 which like switch assembly 20 includes an array of rows of upper control actuators 122 and 132 and lower actuators 126 and 136. Associated with each actuator like the embodiment shown in FIGS. 1-11, is a generally L-shaped actuator member 150 with only one arm being shown in FIG. 12 for the sake of clarity Arm 150 is pivotally mounted by a pivot axle 152 which extends between end walls (not shown) of the switch housing 140 mounted to a console such as a vehicle armrest console or the like. The actuator member 150 has a downwardly depending leg 154 which can swing between a left-most position as shown in phantom lines in the Fig. for actuating a first switch 156 when actuator member 132 is pressed downwardly to a first position Alternatively, when raised upwardly to a second position shown in the Fig., it actuates switch 156 mounted to a circuit board 158 on a support member 160. The generally U-shaped support member 160 includes upwardly inclined facing legs 161 and 163 with switch 156 being mounted to the circuit board 158 on the inside of leg 161.

The actuator member 150 also includes a short generally horizontally extending leg 151 which fits within the cover member of actuator 132 which can be in the form of a resilient or flexible material, if desired. The pushing of actuator member 132 downwardly moves leg 154 to the right-most position as shown in FIG. 12 in which the end actuates a second switch 170 associated with circuit board 172 which is mounted to the inside of leg 163 of the mounting member 160. Switches 156 and 170 are mounted in alignment across from one another on the switch mounting member 160 which will include a linear array of spaced switches extending into and out of the plane of the drawing of FIG. 12 such that multiple L-shaped actuator members 150 mounted on other axles such as the lower pivot axle 174, shown in FIG. 12, can be associated with the lower opposed actuating members 126 and 136. For the sake of clarity the additional members are not shown but the mounting arrangement is similar to that of the first embodiment in which staggered actuating levers of each of the upper and lower actuating members extend between aligned switches and alternatively engage the switch depending on whether the associated actuating control lever is raised or lowered.

In each of the embodiments shown, the switch housing can be extended or retracted to include a greater or lesser number of switches, although ideally, it is desired to limit the vertical stacking of switches to two levels, if possible, so that the vehicle operator is not confronted with too expansive an array of switch decisions. Naturally, the switch housing may include additional or greater or fewer number of horizontally extending vertically spaced switch mounting members than the first embodiment or horizontally spaced vertically extending switch mounting members as in the second embodiment to provide a greater or fewer number of switches. The switch actuating levers are shaped to nest in adjacent relationship to one another and mounted by offset staggered pivot axles to provide the switch control and functions whereby a pair of switches can be actuated by a single actuating member depending upon whether it is raised or lowered with respect to the switch housing in which it is mounted. In some embodiments different switches than those of the preferred embodiments shown herein can be used. It will become apparent to those skilled in the art that these and other modifications to the preferred embodiments can be made without departing from the spirit or scope of the invention as defined by the appended claims.

We claim:

1. An electrical switch assembly comprising:
   a switch housing including at least a pair of facing switch mounting surfaces extending between end walls of said housing;
   a plurality of switch units mounted in spaced relationship on each of said facing surfaces, and aligned with corresponding switches on an opposed facing surface; and
   switch actuator means pivotally mounted between said end walls of said switch housing and including a plurality of switch actuating levers each one extending between a pair of switch units such that either of two associated aligned switch units can be actuated by the selective actuating of one of said actuating levers.

2. The switch assembly as defined in claim 1 wherein said switch mounting surfaces are generally parallel to one another.

3. The switch assembly as defined in claim 1 wherein said switch mounting surfaces are generally non-parallel to one another.

4. The switch assembly as defined in claim 1 wherein said switch housing includes a floor with an upwardly facing surface defining one of said facing surfaces and a wall having a lower surface defining another of said facing surfaces.

5. The switch assembly as defined in claim 4 wherein said floor includes at least a pair of switch units mounted in spaced relationship thereon and said wall includes at least a pair of switch units mounted in spaced relationship thereon and in opposed aligned relationship with said pair of switch units on said floor.

6. An electrical switch assembly comprising:
   a switch housing including at least a pair of facing switch mounting surfaces;
   a plurality of switch units mounted in spaced relationship on each of said facing surfaces, and aligned with corresponding switches on an opposed facing surface wherein said switch housing includes a floor with an upwardly facing surface defining one of said facing surfaces and a wall having a lower surface defining another of said facing surfaces;

wherein said floor includes at least a pair of switch units mounted in spaced relationship thereon said wall includes at least a pair of switch units mounted in spaced relationship thereon and in opposed aligned relationship with said pair of switch units on said floor;

a switch actuator means mounted to said switch housing and including a plurality of switch actuating levers each one extending between a pair of switch units such that either of two associated aligned switch units can be actuated by the selective actuating of one of said actuating levers; and wherein said housing includes spaced end walls, and said floor and said wall extend between said end walls, and wherein said actuator means are pivotally mounted between said end walls with one of said actuator levers extending between a predetermined pair of opposed aligned switch units.

7. The switch assembly as defined in claim 6 and further including a top extending between said end walls above said wall and wherein said wall defines a partition with switch units mounted in spaced relationship on an upper surface facing said top for actuation by actuator means mounted to said housing.

8. The switch assembly as defined in claim 7 wherein said top includes a lower surface facing said partition and includes switch units aligned in opposed relationship to switch units on said upper surface of said partition to be actuated by the same actuator means associated with the aligned opposed switch unit.

9. The switch assembly as defined in claim 7 wherein said assembly includes a plurality of horizontally spaced upper actuator means having switch unit actuating levers for actuating switch units mounted to said top and upper surfaces of said partition.

10. The switch assembly as defined in claim 9 wherein said assembly includes a plurality of horizontally spaced lower actuator means positioned below said upper actuator means and having switch unit actuating levers for actuating switch units mounted to said lower surface of said partition and to said floor.

11. The switch assembly as defined in claim 10 and further including upper and lower actuator means mounted in opposed relationship on opposite sides of said housing, each actuator means including a switch unit actuating lever which is aligned in spaced relationship to a corresponding opposed lever on an opposite side of said housing.

12. The switch assembly as defined in claim 11 wherein each of said actuator means includes an elongated controlling arm for operator control of said actuator and a relatively short actuating lever such that levers of opposed and adjacent actuators can align in spaced horizontal relationship between opposed corresponding pairs of switch units.

13. The switch assembly as defined in claim 12 wherein said actuators are generally S-shaped with an intermediate arm coupling said controlling arm and actuating lever.

14. The switch assembly as defined in claim 13 wherein said switch units are elastomeric dome switches.

15. The switch assembly as defined in claim 14 wherein said switch units are mounted to circuit boards mounted on said surfaces of said housing.

16. The switch assembly as defined in claim 15 wherein said switch units are aligned in a row on each of said mounting surfaces of said housing.

17. An electrical switch assembly comprising:
a switch housing including a pair of spaced end walls and plurality of switch actuating levers pivotally mounted between said end walls in a horizontally and vertically spaced array; and
a plurality of switch units mounted to said housing with at least one switch associated with each of said actuating levers to be actuated thereby.

18. The switch assembly as defined in claim 17 wherein said housing includes facing opposed surfaces and wherein said switch units are mounted in facing opposition on said surfaces with an actuating lever extending therebetween such that each actuating lever can actuate two switches when moved in first and second directions.

19. The switch assembly as defined in claim 18 wherein said switch housing includes a floor with an upwardly facing surface defining one of said facing surfaces and a wall having a lower surface defining another of said facing surfaces.

20. The switch assembly as defined in claim 19 wherein said floor includes at least a pair of switch units mounted in spaced relationship thereon and said wall includes at least a pair of switch units mounted in spaced relationship thereon and in opposed aligned relationship with said pair of switch units on said floor.

21. An electrical switch assembly comprising:
a switch housing including a plurality of switch actuating levers pivotally mounted to said housing in a horizontally and vertically spaced array;
a plurality of switch units mounted to said housing with at least one switch unit associated with each of said actuating levers to be actuated thereby;
wherein said housing includes facing opposed surfaces and wherein switch units are mounted in facing opposition on said surfaces with an actuating lever extending therebetween such that each actuating lever can actuate two switch units when moved in first and second directions;
wherein said switch housing includes a floor with an upwardly facing surface defining one of said facing surfaces and a wall having a lower surface defining another of said facing surfaces;
wherein said floor includes at least a pair of switch units mounted in spaced relationship thereon and said wall includes at least a pair of switch units mounted in spaced relationship thereon and in opposed aligned relationship with said pair of switch units on said floor; and
wherein said housing includes spaced end walls, and said floor and said wall extend between said end walls, and wherein said actuator means are pivotally mounted between said end walls with one of said actuator levers extending between a predetermined pair of opposed aligned switch units.

22. The switch assembly as defined in claim 21 and further including a top extending between said end walls above said first named wall and wherein said first named wall defines a partition with switch units mounted in spaced relationship on an upper surface facing said top for actuation by actuator means mounted to said housing.

23. The switch assembly as defined in claim 22 wherein said top includes a lower surface facing said partition and includes switch units aligned in opposed relationship to switch units on said upper surface of said partition to be actuated by the same actuator means associated with the aligned opposed switch unit.

24. The switch assembly as defined in claim 23 wherein said assembly includes a plurality of horizontally spaced upper actuator means having switch actuating levers for actuating switch units mounted to said top and said upper surface of said partition.

25. The switch assembly as defined in claim 23 wherein said assembly includes a plurality of horizontally spaced lower actuator means positioned below said upper actuator means and having switch unit actuating levers for actuating switch units mounted to said lower surface of said partition and to said floor.

26. The switch assembly as defined in claim 25 and further including upper and lower actuator means mounted in opposed relationship on opposite sides of said housing each with a switch unit actuating lever which is aligned in spaced relationship to a corresponding opposed lever on an opposite side of said housing.

27. The switch assembly as defined in claim 26 wherein each of said actuator means includes an elongated controlling arm for operator control of said actuator coupled to a relatively short actuating lever such that levers of opposed and adjacent actuators are aligned in spaced horizontal relationship between opposed corresponding pairs of switch units.

28. The switch assembly as defined in claim 27 wherein said actuators are generally S-shaped with an intermediate arm coupling said controlling arm and actuating lever.

29. The switch assembly as defined in claim 28 wherein said switch units are elastomeric dome switches.

30. The switch assembly as defined in claim 29 wherein said switch units are mounted to circuit boards mounted on said surfaces of said housing.

31. The switch assembly as defined in claim 30 wherein said switch units are aligned in a row on each of said mounting surfaces of said housing.

32. An electrical switch assembly comprising:
a switch housing including end walls and means for supporting a plurality of switch units in a horizontally and vertically spaced array; and
a plurality of switch unit actuating levers pivotally mounted between said end walls in a vertically and horizontally spaced array in predetermined relationship to said switch units such that the actuation of any one of said actuating levers actuates at least one of said switch units.

33. The switch assembly as defined in claim 32 wherein each of said actuating levers is positioned to actuate at least two switch units when moved in first and second directions.

34. The switch assembly as defined in claim 33 wherein pairs of switch units are mounted in opposed facing relationship and each of said actuating levers extending between an associated one of said switch units.

35. The switch assembly as defined in claim 34 wherein said means for supporting said plurality of switch units includes a plurality of spaced wall means.

36. An electrical switch assembly comprising:
a plurality of spaced wall means for supporting a plurality of switch units in a horizontally and vertically spaced array;
a plurality of switch actuating means positioned to actuate at least two switch units when moved in first and second directions, and support wall means for supporting said switch actuating means in a vertically and horizontally spaced array in predetermined relationship to said switch units such that the actuation of any one of said actuating means actuates at least one of said switch units,
wherein pairs of switch units are mounted in opposed facing relationship and said actuating means includes lever means extending between said switch units;
wherein said means for supporting said switch actuating means comprises at least one pivot axle extending between said support walls; and
wherein said actuating means comprise generally S-shaped members with enlarged operator actuated control arms at one end and an actuating lever at an opposite end.

37. The switch assembly as defined in claim 36 wherein said control arm is coupled to said actuating lever by an intermediate arm which includes means for coupling said actuating means to a pivot axis.

38. The switch assembly as defined in claim 37 wherein said wall means are generally parallel and extend between support walls.

39. A switch assembly for use in a vehicle and including a plurality of switch units, said assembly comprising:
a pair of spaced end walls;
floor means extending between said end walls and including a line of spaced switch units mounted thereon each including a push-button actuator facing upwardly therefrom;
wall means extending between said end walls above said floor and including a line of switch units aligned above and facing said switch units on said floor;
switch unit actuator lever means extending between each pair of opposed facing switch units; and
means for pivotally mounted said switch unit actuator lever means to said end walls such that each lever actuates a unique pair of opposing switch units and actuates one of said switch units when moved in a first direction and another of said switch units when moved in a second direction.

40. A switch assembly for use in a vehicle and including a plurality of switch units, said assembly comprising:
a pair of spaced end walls;
floor means extending between said end walls and including a line of spaced switch units mounted thereon each including a push-button actuator facing upwardly therefrom;
wall means extending between said end walls above said floor an including a line of switch units aligned above and facing said switch units on said floor;
switch unit actuator lever means extending between each pair of opposed facing switch units;
means for mounting said switch unit actuator lever means to said end walls such that each lever actuates a unique pair of opposing switch units and actuates one of said switch units when moved in a first direction and another of said switch units when moved in a second direction; and
further including a line of spaced switch units mounted on a surface of said wall means away from said floor and switch unit actuator lever means for selectively actuating said line of spaced switch units.

41. The switch assembly as defined in claim 40 and further including a top mounted between said end walls and including a line of spaced switch units aligned with the switch units on said surface of said wall means away from said floor and wherein said switch unit actuator lever means actuates said switch units on said top when moved in one direction and on said wall means when moved in an opposite direction.

* * * * *

UNITED STATES PATENT AND TRADEMARK OFFICE
CERTIFICATE OF CORRECTION

PATENT NO. : 5,294,758
DATED : March 15, 1994
INVENTOR(S) : Jay M. Frankhouse et al.

It is certified that error appears in the above-indentified patent and that said Letters Patent is hereby corrected as shown below:

Column 6, line 41
After "to" (first occurrence) --the upper actuating members except that they include a--;

Column 9, claim 6, line 2
After "thereon" insert --and--;

Column 12, claim 37, line 14
"axis" should be --axle--;

Signed and Sealed this

Eighth Day of November, 1994

Attest:

BRUCE LEHMAN

*Attesting Officer*  *Commissioner of Patents and Trademarks*